(12) United States Patent
Sugio et al.

(10) Patent No.: US 10,343,108 B2
(45) Date of Patent: Jul. 9, 2019

(54) AIR DRIER

(71) Applicant: NABTESCO AUTOMOTIVE CORPORATION, Tokyo (JP)

(72) Inventors: Takuya Sugio, Tokyo (JP); Hiroaki Kawanami, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 38 days.

(21) Appl. No.: 15/313,424

(22) PCT Filed: May 26, 2015

(86) PCT No.: PCT/JP2015/065032
§ 371 (c)(1),
(2) Date: Nov. 22, 2016

(87) PCT Pub. No.: WO2015/182583
PCT Pub. Date: Dec. 3, 2015

(65) Prior Publication Data
US 2017/0209831 A1    Jul. 27, 2017

(30) Foreign Application Priority Data
May 27, 2014   (JP) ................. 2014-109130

(51) Int. Cl.
*B01D 53/02*    (2006.01)
*B01D 53/26*    (2006.01)
(Continued)

(52) U.S. Cl.
CPC ........... *B01D 53/261* (2013.01); *B01D 45/08* (2013.01); *B01D 46/0031* (2013.01);
(Continued)

(58) Field of Classification Search
CPC ............ B01D 46/0036; B01D 46/0068; B01D 53/261; B60G 2600/66; B60T 17/004
See application file for complete search history.

(56) References Cited

U.S. PATENT DOCUMENTS 4,071,337 A * 1/1978 Evans ................. B01D 46/003
                                                        210/282
4,655,801 A * 4/1987 Kojima ............... B01D 53/261
                                                        55/DIG. 17

(Continued)

FOREIGN PATENT DOCUMENTS

JP    H04-122628 U    11/1992
JP    H06-076798 U    10/1994
(Continued)

OTHER PUBLICATIONS

International Preliminary Report on Patentability and the Written Opinion of the International Searching Authority as issued in International Patent Application No. PCT/JP2015/065032, dated Nov. 29, 2016.

(Continued)

*Primary Examiner* — Christopher P Jones
(74) *Attorney, Agent, or Firm* — Pillsbury Winthrop Shaw Pittman, LLP

(57) ABSTRACT

An air drier includes an inlet, an outlet, and a collected liquid discharge port. Compressed air flows in the inlet. Dry compressed air is discharged through the outlet. Purge air containing oil and water is discharged through a collected liquid discharge port. The air drier further includes a drying container that is filled with desiccant, and a case that covers the drying container. The air drier is provided with, downstream of the collected liquid discharge port, a separation portion that separates clean air from oil and water in the purge air, a clean air outlet through which the clean air is discharged, and a collected liquid retaining portion in which collected liquid is retained. The collected liquid is separated oil and water.

11 Claims, 2 Drawing Sheets

(51) Int. Cl.
  *F04B 39/04*  (2006.01)
  *F04B 39/12*  (2006.01)
  *F04B 39/16*  (2006.01)
  *B60T 17/00*  (2006.01)
  *B01D 46/00*  (2006.01)
  *B01D 45/08*  (2006.01)
  *F04B 23/02*  (2006.01)
  *F04B 53/10*  (2006.01)
  *F04B 53/14*  (2006.01)
  *F04B 53/16*  (2006.01)
  *B01D 53/04*  (2006.01)

(52) U.S. Cl.
  CPC ............ *B01D 53/26* (2013.01); *B60T 17/004* (2013.01); *F04B 23/02* (2013.01); *F04B 39/04* (2013.01); *F04B 39/12* (2013.01); *F04B 39/16* (2013.01); *F04B 53/10* (2013.01); *F04B 53/14* (2013.01); *F04B 53/162* (2013.01); *B01D 53/0446* (2013.01); *B01D 2257/702* (2013.01)

(56) References Cited

U.S. PATENT DOCUMENTS

| | | | | |
|---|---|---|---|---|
| 6,447,583 | B1* | 9/2002 | Thelen | B01D 53/06 95/113 |
| 7,857,882 | B1* | 12/2010 | Johnson | B01D 45/08 55/385.3 |
| 2003/0177743 | A1* | 9/2003 | Witengier | B01D 50/002 55/320 |
| 2005/0045041 | A1* | 3/2005 | Hechinger | B01D 53/0415 96/121 |
| 2007/0028777 | A1* | 2/2007 | Hoffman | B01D 53/261 96/143 |
| 2012/0137887 | A1* | 6/2012 | Minato | B01D 53/0415 96/118 |
| 2013/0319232 | A1* | 12/2013 | Quinn | B01D 17/02 95/70 |
| 2014/0144326 | A1 | 5/2014 | Minato et al. | |
| 2015/0033685 | A1 | 2/2015 | Sugio et al. | |
| 2015/0052861 | A1 | 2/2015 | Sugio et al. | |

FOREIGN PATENT DOCUMENTS

| | | |
|---|---|---|
| JP | 2012-106155 A | 6/2012 |
| JP | 2012-106156 A | 6/2012 |
| JP | 2013-032089 A | 2/2013 |
| JP | 2013-068170 A | 4/2013 |
| JP | 2014-028361 A | 2/2014 |
| JP | 2014-091059 A | 5/2014 |
| JP | 2014-163326 A | 9/2014 |
| JP | 2014-190156 A | 10/2014 |

OTHER PUBLICATIONS

International Search Report as issued in International Patent Application No. PCT/JP2015/065032, dated Jun. 30, 2015.

* cited by examiner

AIR DRIER

CROSS-REFERENCE TO RELATED APPLICATIONS

This application is the U.S. National Stage of PCT/JP2015/065032, filed May 26, 2015, which in turn claims priority to Japanese Patent Application No. JP 2014-109130, filed May 27, 2014. The contents of these applications are incorporated herein by reference in their entireties.

TECHNICAL FIELD

The present invention relates to an air drier for drying compressed air supplied from a compressor.

BACKGROUND ART

A vehicle such as a truck, a bus, or a construction machine controls the systems of brakes, suspensions, and the like using compressed air delivered by a compressor, which is directly connected to the engine. The compressed air contains water contained in the atmospheric air and oil for lubricating the interior of the compressor. If the compressed air containing the water and the oil enters the systems, metal rusting and swelling of rubber members (such as O-rings) occur, thus causing malfunction. Therefore, an air drier, which removes water and oil from compressed air, is arranged downstream of the compressor in an air system (see, for example, Patent Document 1).

The interior of the air drier is filled with a filter and desiccant such as silica gel and zeolite. The air drier removes water from the compressed air to dry the compressed air by the desiccant adsorbing the water.

During a loading operation (dehumidifying operation) which removes water, the air drier causes compressed air delivered through the inlet to pass through the drying container and supplies the air to an air tank through an outlet while retaining the compressed dry air in a case of the air drier. During an unloading operation (regenerating operation) which regenerates the desiccant, the air drier opens an exhaust valve of a collected liquid discharging device to cause the compressed dry air retained in the case of the air drier to pass through the drying container and discharge purge air, which contains oil and water, through a collected liquid discharge port. The air drier periodically repeats the loading operation and the unloading operation.

In regeneration of the desiccant of the air drier, purge air discharged from the air drier contains oil as well as water. Thus, considering the environmental burden, providing an oil separator downstream of the collected liquid discharge port in the air drier has been proposed (see, for example, Patent Document 2). In the oil separator, an impingement member is provided in a housing for purge air containing oil and water to strike. The oil separator performs vapor-liquid separation by causing the purge air to strike the impingement member to collect oil and water and discharge clean air.

PRIOR ART DOCUMENTS

Patent Documents

Patent Document 1: Japanese Laid-Open Patent Publication No. 2012-106155

Patent Document 2: Japanese Laid-Open Patent Publication No. 2014-28361

SUMMARY OF THE INVENTION

Problem that the Invention is to Solve

With the aforementioned configuration, an oil separator in addition to an air drier needs to be installed in a vehicle. Thus, additional installation space needs to be reserved in addition to the space for the air drier. Thus, an air drier is desired that decreases additionally-required installation space as much as possible while taking an action against the environmental burden.

Accordingly, it is an objective of the present invention to provide an air drier that decreases additionally-required installation space as much as possible while taking an action against the environmental burden.

Means for Solving the Problems

Means to achieve the objective and its operational advantage will now be described.

To achieve the objective, as an overview, an air drier includes an inlet through which compressed air flows in, an outlet through which dry compressed air is discharged, a collected liquid discharge port through which purge air containing oil and water is discharged, a drying container that is filled with desiccant, and a case that covers the drying container. The air drier is provided with, downstream of the collected liquid discharge port, a separation portion that separates clean air from oil and water in the purge air, a clean air outlet through which the clean air is discharged, and a collected liquid retaining portion in which collected liquid, which is separated oil and water, is retained.

According to the above configuration, the separation portion and the clean air outlet are arranged downstream of the collected liquid discharge port. Thus, oil and water are separated from the purge air containing oil and water, and only clean air is discharged to the atmosphere through the clean air outlet. This reduces the environmental burden. In addition, the air drier can include a function of separating oil and water from the purge air. Thus, as long as the space for retaining collected liquid, which is the separated oil and water, is reserved, additionally-required installation space is minimized.

Preferably, the air drier further includes a collected liquid delivering device that delivers collected liquid retained in the collected liquid retaining portion to an external device.

According to the above configuration, the collected liquid retained in the collected liquid retaining portion is delivered to the external device by the delivering device. This allows the collected liquid, which is separated oil and water, to be delivered to the external device while being retained in the collected liquid retaining portion. Therefore, as long as the space for installing the external device, which uses the collected liquid, which is the separated oil and water, is reserved, additionally-required installation space is minimized.

Preferably, in the air drier, an exhaust valve is provided in the collected liquid discharge port, and the collected liquid delivering device delivers collected liquid to the external device in conjunction with displacement of a valve member of the exhaust valve.

According to the above configuration, in conjunction with the displacement of the valve member of the exhaust valve, the collected liquid delivering device delivers collected liquid. This allows the collected liquid to be delivered to the external device without preparing additional power for delivering the collected liquid.

Preferably, in the air drier, the collected liquid delivering device includes a piston that contacts with the valve member of the exhaust valve, an urging spring that urges the piston toward the exhaust valve, a collected liquid accommodation portion into which collected liquid retained in the collected liquid retaining portion is drawn by the piston and from which the drawn collected liquid is pushed out to the external device by the piston, and a check valve arranged between the external device and the collected liquid accommodation portion.

According to the above configuration, the piston of the collected liquid delivering device is displaced by the urging spring in conjunction with the displacement of the valve member of the exhaust valve, and the collected liquid delivering device is normally closed by the check valve. This allows the collected liquid to be drawn into the collected liquid accommodation portion and be pushed out to the external device.

Preferably, in the air drier, the collected liquid delivering device draws collected liquid retained in the collected liquid retaining portion into the collected liquid accommodation portion through displacement of the piston when the valve member of the exhaust valve is moved in a closing direction, and pushes out collected liquid drawn into the collected liquid accommodation portion to the external device through displacement of the piston when the valve member of the exhaust valve is moved in an opening direction.

According to the above configuration, with the displacement of the piston, the collected liquid is drawn into the collected liquid accommodation portion. With the displacement of the piston, the collected liquid in the collected liquid accommodation portion is pushed out to the external device. Thus, the collected liquid is allowed to be delivered to the external device with discharge of the purge air.

Preferably, the air drier includes a baffle plate between the collected liquid discharge port and the separation portion. The baffle plate interrupts flow of the purge air.

According to the above configuration, the baffle plate is provided to interrupt the flow of purge air. Thus, oil and water contained in the purge air are separated by striking the baffle plate. This increases the collection rate of oil and water in combination with the separation portion.

Preferably, the air drier includes a collected liquid splash suppressing member arranged in a lower portion of the separation portion. The collected liquid returning member restrains splashing of collected liquid retained in the collected liquid retaining portion.

According to the above configuration, the lower portion of the separation portion includes the collected liquid returning member. This controls splashing of collected liquid even if the collected liquid retained in the collected liquid retaining portion highly splashes due to vibration and the like.

Effects of the Invention

According to the present invention, while the environmental burden is considered, additionally-required installation space is minimized.

MODES FOR CARRYING OUT THE INVENTION

Figure 1:
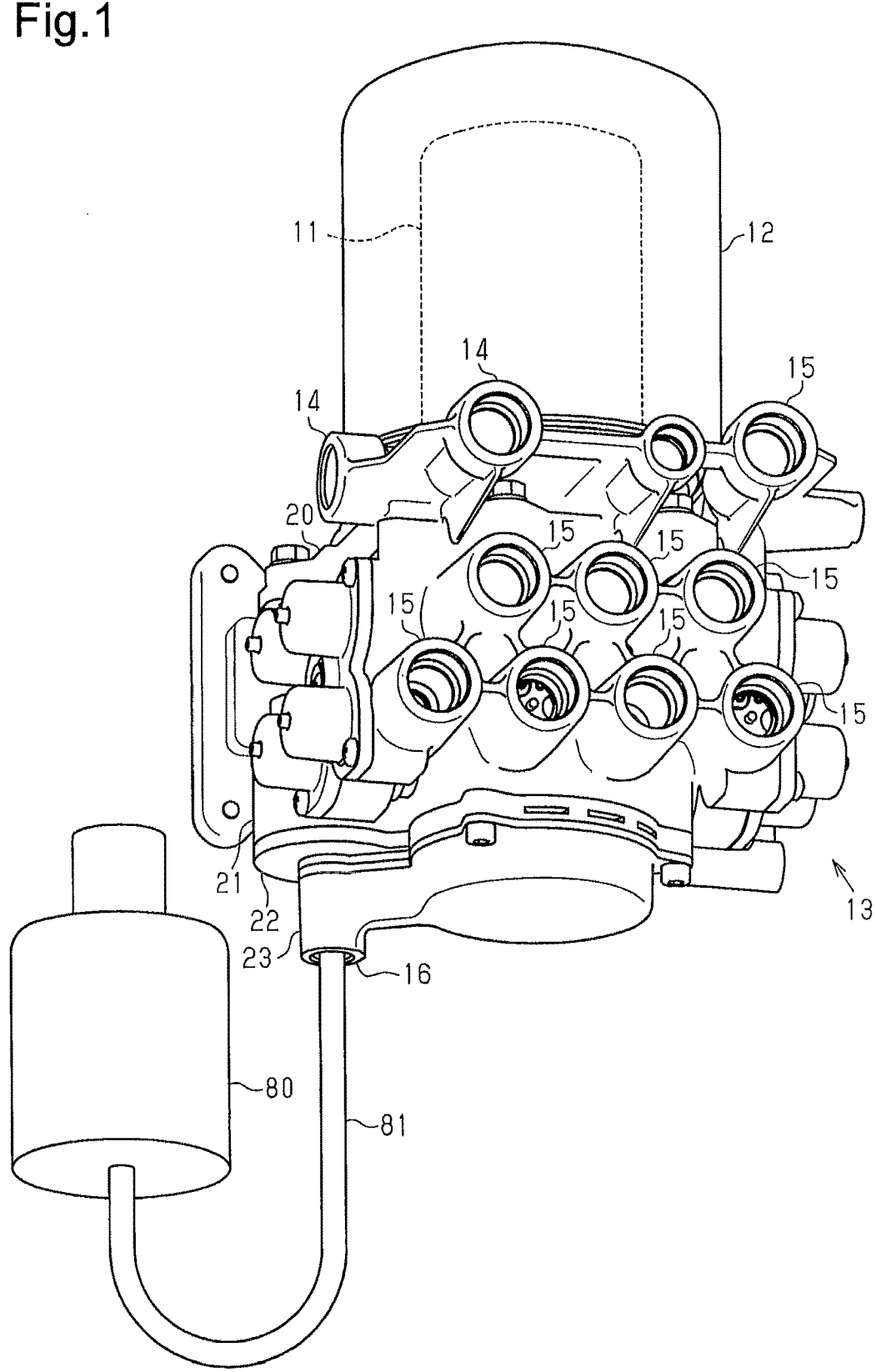
FIG. 1 is a perspective view of an air drier according to one embodiment of the present invention, illustrating its schematic structure.
Figure 2:
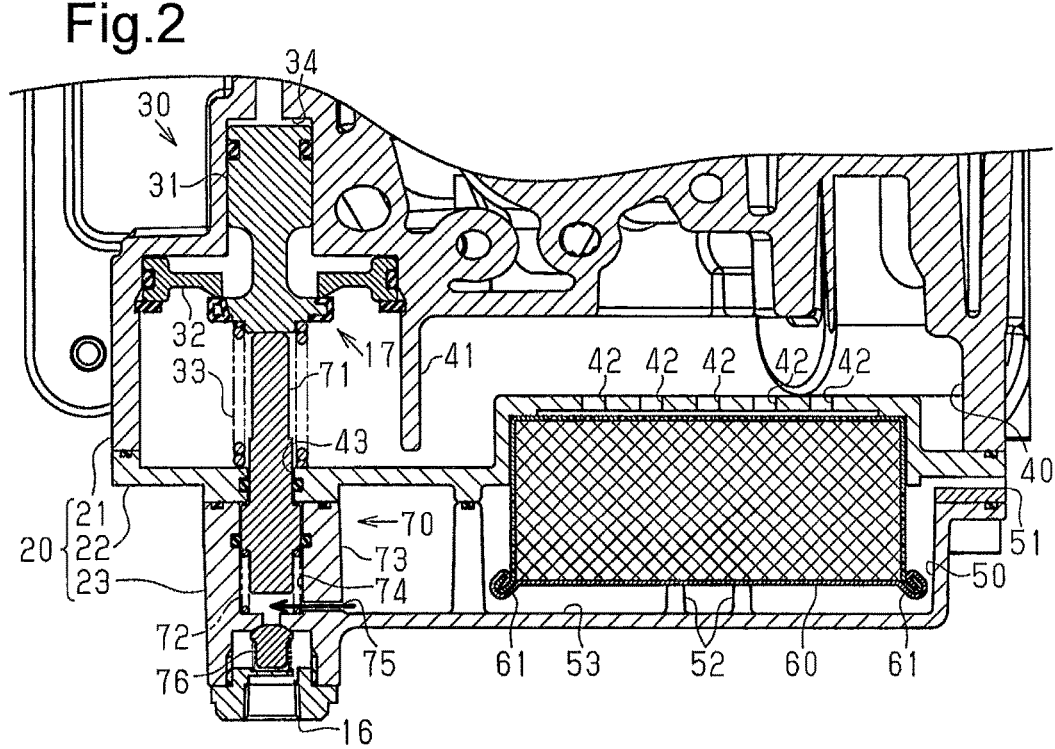
FIG. 2 is a cross-sectional view of the air drier during a loading operation, illustrating a primary part of the inner structure.
Figure 3:
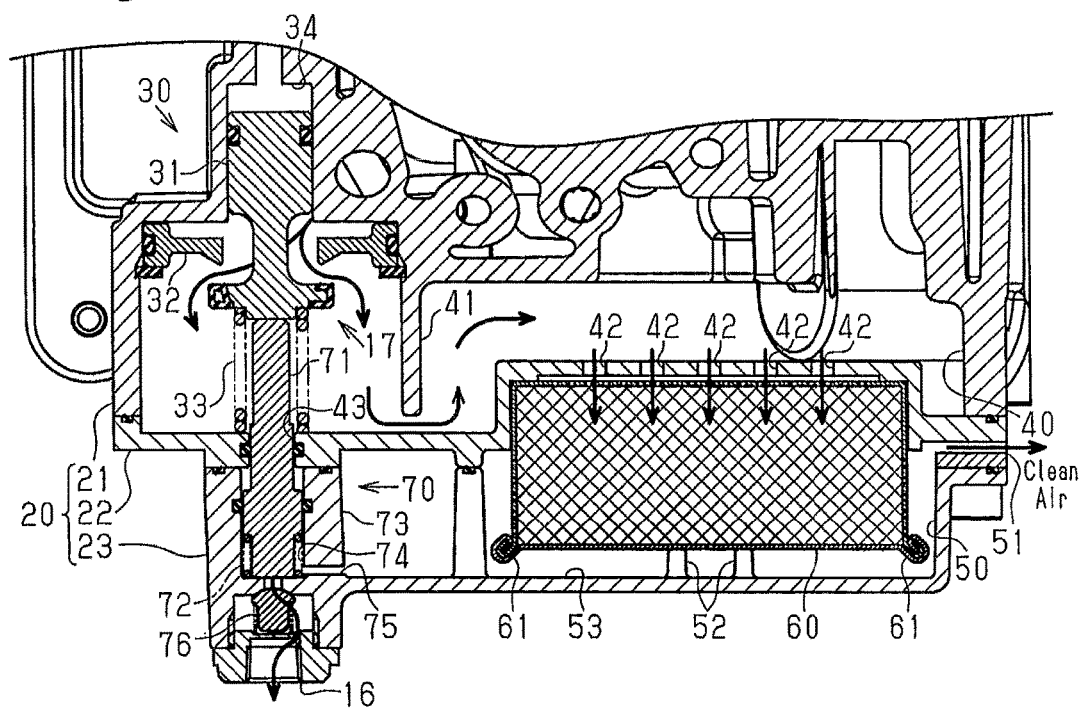
FIG. 3 is a cross-sectional view of the air drier during an unloading operation, illustrating the primary part of the inner structure.

With reference to FIGS. 1 to 3, an air drier according to one embodiment of the present invention will now be described.

As shown in FIG. 1, the air drier includes a drying container 11, which is filled with desiccant, a case 12, which covers the drying container 11, and a supporting base 20, on which the case 12 is mounted.

A multi-circuit protection valve 13 is integrally provided on the supporting base 20. Inlets 14, through which compressed air flows in, and outlets 15, through which dry compressed air is discharged, are provided on the supporting base 20. The inlets 14 are connected to a compressor (not shown), and compressed air is supplied through the inlets 14. The outlets 15 are connected to air tanks of different systems (not shown), and compressed dry air is discharged through the outlets 15.

During a loading operation, the air drier dries compressed air, which flows in through the inlets 14, with the desiccant and discharges the dried compressed air through the outlets 15. During an unloading operation, the air drier causes compressed air within the case 12 to pass through the interior of the drying container and discharges purge air, which contains oil and water, through a collected liquid discharge port provided in the supporting base 20.

The air drier according to the present embodiment has a function to separate oil and water from purge air, which contains oil and water produced during the unloading operation. Thus, a collected liquid delivering port 16 is provided in a lower part of the air drier. Through the collected liquid delivering port 16, only collected liquid, which has been separated from the purge air, is delivered to a tank 80, which is an external device. The collected liquid delivering port 16 is connected with the tank 80 via a connection hose 81.

As shown in FIGS. 2 and 3, the supporting base 20 of the air drier includes a supporting member 21 having an open bottom, a first lid member 22, which closes the opening of the supporting member 21, and a second lid member 23, which is attached to the first lid member 22. An exhaust valve 30 is provided in the supporting member 21 of the supporting base 20. The exhaust valve 30 discharges purge air, which contains oil and water produced during the unloading operation, through the collected liquid discharge port 17. The exhaust valve 30 includes a valve member 31, a valve seat 32, and an urging spring 33, which urges the valve member 31. The urging spring 33 is arranged between the valve member 31 and the first lid member 22. The exhaust valve 30 is urged by the urging spring 33 in a closed valve state in which the valve member 31 is seated on the valve seat 32. A control chamber 34, which opens the valve member 31 against the urging force of the urging spring 33, is provided in a portion of the supporting member 21 that is located above the exhaust valve 30. During the unloading operation, supply of control instruction pressure to the control chamber 34 from a governor (not shown) lowers the valve member 31 so that the exhaust valve 30 is opened.

Space defined between the supporting member 21 and the first lid member 22 functions as an expansion chamber 40 that expands purge air containing oil and water. A baffle plate 41, which interrupts the flow of the purge air, is provided in the expansion chamber 40. The baffle plate 41 protrudes downward from the supporting member 21 of the supporting base 20.

Space defined between the first lid member 22 and the second lid member 23 functions as a separation chamber 50 in which oil and water are separated from the purge air containing oil and water. A separation portion 60 in which oil and water are separated from the purge air containing oil and water is arranged in the separation chamber 50. The separation portion 60 is formed of, e.g., crushed aluminum. The crushed aluminum is obtained by shaping metal material such as metal wire or metal foil and has many small holes. The upper surface of the separation portion 60 is in contact with the lower surface of the first lid member 22. Communication holes 42, through which the expansion chamber 40 is in communication with the separation chamber 50, are provided in a portion of the first lid member 22 that faces the separation portion 60. The separation portion 60 is arranged while being apart from the bottom surface of the second lid member 23 by two supporting columns 52 in the separation chamber 50. The lower portion of the separation chamber 50 functions as a collected liquid retaining portion 53, in which collected liquid, which is oil and water separated from the purge air, is retained.

A collected liquid returning member 61 is provided in the lower portion of the separation portion 60. A clean air outlet 51 is provided in a side portion of the separation chamber 50. Clean air, in which oil and water are separated from the purge air, is discharged through the clean air outlet 51. The clean air outlet 51 is open to the atmosphere. The collected liquid returning member restrains splashing of collected liquid retained in the collected liquid retaining portion 53 caused by vibration and the like, and the collected liquid is restrained from exiting through the clean air outlet 51 to the atmosphere.

A collected liquid delivering device 70, which delivers collected liquid retained in the collected liquid retaining portion 53 to a tank 80, which is an external device, is provided in the second lid member 23. The collected liquid delivering device 70 is arranged on the vertical line above the exhaust valve 30. The collected liquid delivering device 70 delivers the collected liquid to the tank 80 in conjunction with the displacement of the valve member 31 of the exhaust valve 30. The collected liquid delivering device 70 includes a columnar piston 71, which is in contact with the valve member 31 of the exhaust valve 30, and an urging spring 72, which urges the piston 71 toward the exhaust valve 30. The upper end of the piston 71 is in contact with the lower surface of the valve member 31 of the exhaust valve 30.

A cylindrical piston supporting portion 73, through which the piston 71 passes, is provided in the second lid member 23. The interior space of the piston supporting portion 73 functions as a collected liquid accommodation portion 74, which receives collected liquid. A collected liquid passage 75 for drawing the collected liquid retained in the collected liquid retaining portion 53 into the collected liquid accommodation portion 74 is provided in a side portion of the piston supporting portion 73. A check valve 76 is provided in a lower portion of the piston supporting portion 73. The check valve 76 closes so that collected liquid within the collected liquid accommodation portion 74 does not leak. The check valve 76 opens when the collected liquid is delivered by the piston 71.

A through-hole 43, through which the piston 71 passes, is defined in a portion of the first lid member 22 that is connected with the interior space of the piston supporting portion 73 of the second lid member 23. The lower end of the piston 71 is located in the collected liquid accommodation portion 74. When the piston 71 moves upward, negative pressure of the collected liquid accommodation portion 74 draws collected liquid of the collected liquid retaining portion 53 through the collected liquid passage 75. When the piston 71 moves downward, the collected liquid received in the collected liquid accommodation portion 74 is delivered.

With reference to FIG. 2 or 3, operation of the air drier configured as above will now be described.

First, as shown in FIG. 3, during the unloading operation, control instruction pressure is supplied by a governor (not shown) to the control chamber 34 so that the valve member 31 of the exhaust valve 30 is lowered. When the valve member 31 of the exhaust valve 30 is lowered, the collected liquid discharge port 17 is opened, and purge air containing oil and water enters the expansion chamber 40. The purge air that has entered the expansion chamber 40 goes forward within the expansion chamber 40 while striking the baffle plate 41. The purge air that advances to the bottom of the inside of the expansion chamber 40, passes through the communication holes 42, and enters the separation chamber 50. At the same time, the purge air gets through the separation portion 60. When the purge air passes through the separation portion 60, oil and water are separated. The separated oil and water stream down the separation portion 60 and are retained in the collected liquid retaining portion 53 of the supporting base 20. Clean air, which is the purge air in which oil and water are separated, is discharged through the clean air outlet 51.

Next, as shown in FIG. 2, during the loading operation, the governor (not shown) stops supplying the control instruction pressure to the control chamber 34 so that the valve member 31 of the exhaust valve 30 is raised. When the valve member 31 of the exhaust valve 30 is raised, the collected liquid discharge port 17 is closed. Thus, the purge air containing oil and water stops advancing. When the valve member 31 of the exhaust valve 30 is raised, the piston 71 is also raised. This generates negative pressure in the collected liquid accommodation portion 74 so that the collected liquid retained in the collected liquid retaining portion 53 is drawn into the collected liquid accommodation portion 74.

As shown in FIG. 3, in switching to the unloading operation, the valve member 31 of the exhaust valve 30 is lowered, and the piston 71 is lowered. The collected liquid received in the collected liquid accommodation portion 74 is pushed out, and the collected liquid is delivered to the tank 80, which is an external device, through the connection hose 81 while the check valve 76 opens.

In this way, the air drier according to the present embodiment can discharge clean air to the atmosphere by separating oil and water from the purge air containing oil and water, which are discharged through the collected liquid discharge port 17, and deliver the separated oil and water to a tank, which is an external device, by the collected liquid delivering device 70.

In the collected liquid delivering device 70, the piston 71 is operated in conjunction with the displacement of the valve member 31 of the exhaust valve 30, and the collected liquid is delivered to an external device. This allows the collected liquid to be delivered without preparing additional power for operating the collected liquid delivering device 70.

As described above, the present embodiment provides the following advantages.

(1) The separation portion 60, which separates oil and water contained in purge air, the clean air outlet 51, and the collected liquid delivering device 70 are provided in the supporting base 20. Thus, only clean air is discharged to the atmosphere through the clean air outlet 51 after oil and water are separated from the purge air that contains oil and water. This reduces the environmental burden. While collected liquid, which is the separated oil and water, is retained in the collected liquid retaining portion 53, the collected liquid delivering device 70 delivers the collected liquid to the tank 80. This allows the air drier to have a function of separating oil and water from the purge air. Therefore, as long as the space for installing an external device that uses the collected liquid, which is the separated oil and water, is reserved, additionally-required installation space is minimized as much as possible.

(2) The collected liquid delivering device 70 delivers collected liquid in conjunction with the displacement of the valve member 31 of the exhaust valve 30. This allows the collected liquid to be delivered to the tank 80 without preparing additional power for delivering the collected liquid.

(3) The piston 71 of the collected liquid delivering device 70 is displaced by the urging spring 72 in conjunction with the displacement of the valve member 31 of the exhaust valve 30, and the collected liquid delivering device 70 is normally closed by the check valve 76. This allows the collected liquid to be drawn into the collected liquid accommodation portion 74 and be pushed out to the tank 80.

(4) During the loading operation, the displacement of the piston 71 draws the collected liquid into the collected liquid accommodation portion 74. During the unloading operation, the displacement of the piston 71 pushes out the collected liquid in the collected liquid accommodation portion 74 to the tank 80. Thus, during the discharge of the purge air, the collected liquid is also allowed to be delivered to the tank 80.

(5) The baffle plate 41 is provided to interrupt the flow of purge air. Thus, the oil and water contained in the purge air are separated by striking the baffle plate 41. This increases the collection rate of oil and water in combination with the separation portion 60.

(6) The lower portion of the separation portion 60 includes the collected liquid returning member 61. This limits splashing of collected liquid even if collected liquid retained in the collected liquid retaining portion 53 highly splashes due to vibration and the like.

The above-illustrated embodiment may be modified in the following forms.

In the above-illustrated embodiment, the multi-circuit protection valve 13 is included. However, the configuration of the multi-circuit protection valve 13 may be omitted.

In the above-illustrated configuration, the separation portion 60 includes the collected liquid returning member 61. However, the collected liquid returning member 61 may be omitted if splashing of collected liquid from the collected liquid retaining portion 53 does not cause a problem in the separation chamber 50. According to such a configuration, the shape of the separation portion 60 is simplified.

In the above-illustrated configuration, the expansion chamber 40 includes the baffle plate 41. However, a plurality of baffle plates 41 may be provided. Alternatively, the baffle plate 41 may be omitted if it is possible to separate oil and water from purge air without the baffle plate 41. Such a configuration is easy to process.

During the unloading operation, the above-illustrated embodiment causes the compressed air in the case 12 to pass through the interior of the drying container. However, during the unloading operation, compressed air of a tank, which is separately provided, may pass through the interior of the drying container. The tank may be a tank in which compressed air used for brakes and the like can be retained or a tank in which compressed air for the unloading operation can be retained.

In the above-illustrated embodiment, during the loading operation, collected liquid is drawn into the collected liquid accommodation portion 74, and during the unloading operation, the collected liquid is pushed out of the collected liquid accommodation portion 74. However, the collected liquid may be pushed out of the collected liquid accommodation portion 74 during the loading operation, and the collected liquid may be drawn into the collected liquid accommodation portion 74 during the unloading operation. In other words, with the displacement of the exhaust valve 30 during the loading operation, the piston pushes out the collected liquid from the collected liquid accommodation portion, and with the displacement of the exhaust valve 30 during the unloading operation, the piston draws the collected liquid into the collected liquid accommodation portion.

In the above-illustrated configuration, the collected liquid delivering device 70 includes the piston 71, the urging spring 72, the collected liquid accommodation portion 74, and the check valve 76. However, the configuration of the collected liquid delivering device 70 is not limited to the above configuration. For example, when the valve member 31 of the exhaust valve 30 further extends, the valve member 31 of the exhaust valve 30 may draw collected liquid into the collected liquid accommodation portion 74 and may push out the collected liquid from the collected liquid accommodation portion 74.

In the above-illustrated configuration, the collected liquid delivering device 70 delivers collected liquid to an external device in conjunction with the displacement of the valve member 31 of the exhaust valve 30. However, the delivering does not necessarily need to be in conjunction with the displacement of the valve member 31 of the exhaust valve 30. In other words, the collected liquid delivering device may deliver the collected liquid at its own timing.

In the above-illustrated embodiment, the tank 80 is an external device. However, a device that uses oil may be treated as the external device. For example, an oil pan of an engine may be the external device, and the collected liquid delivering device 70 may deliver collected liquid to the oil pan of the engine.

In the above-illustrated embodiment, the tank 80 may be integrally provided in the air drier. For example, if the air drier has space in the lower portion, a tank may be integrally provided in the lower portion of the supporting base 20 by fixing with screws and the like.

In the above-illustrated embodiment, the configuration of the collected liquid delivering device 70 may be omitted. Even with such a configuration, the air drier has a function to separate oil and water from the purge air. Thus, as long as the space for retaining collected liquid, which is separated oil and water, is reserved, additionally-required installation space is minimized.

DESCRIPTION OF REFERENCE NUMERALS

11 . . . drying container, 12 . . . case, 13 . . . multi-circuit protection valve, 14 . . . inlet, 15 . . . outlet, 16 . . . collected liquid delivering port, 17 . . . collected liquid discharge port, 20 . . . supporting base, 21 . . . supporting member, 22 . . . first lid member, 23 . . . second lid member, 30 . . . exhaust valve, 31 . . . valve member, 32 . . . valve seat, 33 . . . urging spring, 34 . . . control chamber, 40 . . . expansion chamber, 41 . . . baffle plate, 42 . . . communication hole, 43 . . . through-hole, 50 . . . separation chamber, 51 . . . clean air outlet, 52 . . . supporting column, 53 . . . collected liquid retaining portion, 60 . . . separation portion, 61 . . . collected liquid returning member, 70 . . . collected liquid delivering device, 71 . . . piston, 72 . . . urging spring, 73 . . . piston supporting portion, 74 . . . collected liquid accommodation portion, 75 . . . collected liquid passage, 76 . . . check valve, 80 . . . tank, 81 . . . connection hose.

The invention claimed is:

1. A system comprising:
a compressor that supplies compressed air;
an air dryer connected to the compressor, the air dryer configured to dry the compressed air supplied from the compressor and supply dried compressed air,
an air tank connected to the air dryer, to which the dried compressed air is supplied from the air dryer,
wherein the air dryer comprises:
a drying container that is filled with desiccant;
a case that covers the drying container;
a base on which the case is mounted;
an inlet through which compressed air from the compressor flows in;
an outlet through which dry compressed air is discharged to the air tank;
a collected liquid discharge port through which purge air containing oil and water is discharged from the case to the base in the air dryer during regeneration of the desiccant;
a separation portion that separates clean air from oil and water in the purge air during the regeneration of the desiccant;
a clean air outlet through which the clean air, which is separated from the oil and water in the purged air during the regeneration of the desiccant, is discharged;
a collected liquid retaining portion in which collected liquid, which is separated oil and water, is retained; and
a collected liquid delivering port that delivers the collected liquid, which is separated from the purge air, to the outside of the air dryer,
wherein the separation portion, the clean air outlet, and the collected liquid retaining portion are provided downstream of the collected liquid discharge port.

2. The system according to claim 1, further comprising a collected liquid delivering device that delivers collected liquid retained in the collected liquid retaining portion to an external device.

3. The system according to claim 2, further comprising an exhaust valve provided in the collected liquid discharge port,
wherein the collected liquid delivering device configured to deliver collected liquid to the external device in conjunction with displacement of a valve member of the exhaust valve.

4. An air dryer comprising:
an inlet through which compressed air flows in;
an outlet through which dry compressed air is discharged;
a collected liquid discharge port through which purge air containing oil and water is discharged;
a drying container that is filled with desiccant; and
a case that covers the drying container,
wherein the air dryer is provided with, downstream of the collected liquid discharge port:
a separation portion that separates clean air from oil and water in the purge air;
a clean air outlet through which the clean air is discharged; and
a collected liquid retaining portion in which collected liquid, which is separated oil and water, is retained,
a collected liquid delivering device that delivers collected liquid retained in the collected liquid retaining portion to an external device,
an exhaust valve provided in the collected liquid discharge port,
wherein the collected liquid delivering device includes:
a piston that is in contact with the valve member of the exhaust valve;
an urging spring that urges the piston toward the exhaust valve;
a collected liquid accommodation portion into which collected liquid retained in the collected liquid retaining portion is drawn by the piston and from which the drawn collected liquid is pushed out to the external device by the piston; and
a check valve arranged between the external device and the collected liquid accommodation portion,
wherein the collected liquid delivering device delivers collected liquid to the external device in conjunction with displacement of a valve member of the exhaust valve.

5. The air dryer according to claim 4, wherein the collected liquid delivering device is configured to:
draw collected liquid retained in the collected liquid retaining portion into the collected liquid accommodation portion through displacement of the piston when the valve member of the exhaust valve is moved in a closing direction, and
push out collected liquid drawn into the collected liquid accommodation portion to the external device through displacement of the piston when the valve member of the exhaust valve is moved in an opening direction.

6. The system according to claim 1, further comprising a baffle plate between the collected liquid discharge port and the separation portion,
wherein the baffle plate is configured to interrupt flow of the purge air.

7. The system according to claim 1, further comprising a collected liquid returning member arranged in a lower portion of the separation portion,
wherein the collected liquid returning member configured to restrain splashing of collected liquid retained in the collected liquid retaining portion.

8. The system according to claim 1, wherein, during a loading operation, the air dryer dries the compressed air from the compressor that flows in through the inlet and discharges the dry compressed air through the outlet to the air tank; and
wherein, during an unloading operation, the air dryer causes the compressed air within the case to pass through the drying container and discharges the purge air, which contains oil and water, through the collected liquid discharge port.

9. The system according to claim 1, wherein the collected liquid retained in the collected liquid retaining portion is delivered to an external device via the collected liquid delivering port.

10. The system according to claim 1, wherein the collected liquid discharge port, the separation portion, the clean air outlet, the collected liquid retaining portion, and the collected liquid delivering port are provided with the base.

11. The system according to claim 1, wherein the case is integrated with the base to form the air dryer.

* * * * *